United States Patent
Lüer

(10) Patent No.: US 11,596,881 B2
(45) Date of Patent: Mar. 7, 2023

(54) DEVICE FOR FILTERING LIQUIDS

(71) Applicant: PANTREON GMBH, Gmunden (AT)

(72) Inventor: Andreas Lüer, Vorchdorf (AT)

(73) Assignee: PANTREON GMBH, Gmunden (AT)

( * ) Notice: Subject to any disclaimer, the term of this patent is extended or adjusted under 35 U.S.C. 154(b) by 3 days.

(21) Appl. No.: 17/601,904

(22) PCT Filed: Nov. 27, 2020

(86) PCT No.: PCT/AT2020/060423
§ 371 (c)(1),
(2) Date: Oct. 6, 2021

(87) PCT Pub. No.: WO2021/108821
PCT Pub. Date: Jun. 10, 2021

(65) Prior Publication Data
US 2022/0088513 A1 Mar. 24, 2022

(30) Foreign Application Priority Data
Dec. 2, 2019 (AT) .............................. A 51048/2019

(51) Int. Cl.
*B01D 33/80* (2006.01)
*B01D 33/37* (2006.01)
(Continued)

(52) U.S. Cl.
CPC ............. *B01D 33/80* (2013.01); *B01D 33/37* (2013.01); *B01D 33/44* (2013.01); *B01D 35/06* (2013.01); *B01D 35/18* (2013.01); *B01D 63/16* (2013.01)

(58) Field of Classification Search
CPC .. B01D 2201/62; B01D 33/073; B01D 33/31; B01D 33/37; B01D 33/72; B01D 33/74;
(Continued)

(56) References Cited

U.S. PATENT DOCUMENTS 3,438,497 A    4/1969   Maestrelli
3,583,567 A    6/1971   Maestrelli
(Continued)

FOREIGN PATENT DOCUMENTS

AT          508893 A4    5/2011
DE    102010019871 A1    11/2011
(Continued)

OTHER PUBLICATIONS

International Search Report dated Feb. 17, 2021, 2 Pages.
Austrian Patent Office issued Decision to Grant and equivalent English translation, 2 Pages.

*Primary Examiner* — Akash K Varma
(74) *Attorney, Agent, or Firm* — Lucas & Mercanti, LLP

(57) ABSTRACT

A device for filtering liquids includes a tank, a tank inlet for introducing a liquid to be filtered into the tank, a tank outlet for a retentate, and at least one rotor rotatably drivable around a tank axis, the at least one rotor having a hollow shaft supported in an end wall and attached thereto a support device for filter elements arranged at a distance from the tank axis, the filter elements being fluidically connected to the hollow shaft for discharging a filtered permeate from the tank, wherein an inner lateral surface of the tank comprises at least one guide for diverting the liquid toward the filter elements. At least one of the at least one guide forms a receptacle for at least one conditioning device for adjusting process conditions.

8 Claims, 3 Drawing Sheets

(51) Int. Cl.
*B01D 35/06* (2006.01)
*B01D 35/18* (2006.01)
*B01D 63/16* (2006.01)
*B01D 33/44* (2006.01)

(58) Field of Classification Search
CPC ........ B01D 33/80; B01D 33/44; B01D 35/06; B01D 35/18; B01D 63/16; B01D 65/02; B01D 33/06; B01D 33/21; B01D 63/06; B01D 2315/02; B01D 2315/06
USPC .......................................................... 210/179
See application file for complete search history.

(56) References Cited

U.S. PATENT DOCUMENTS

| | | | |
|---|---|---|---|
| 4,728,424 A | | 3/1988 | Miura |
| 8,551,305 B2 | | 10/2013 | Behr |
| 9,034,190 B2 | | 5/2015 | Lüer |
| 2006/0041216 A1 | | 2/2006 | McLaughlin |
| 2009/0242424 A1 | * | 10/2009 | Behr ...................... C02F 1/4672 205/757 |
| 2013/0015120 A1 | * | 1/2013 | Luer ...................... B01D 33/31 210/330 |
| 2013/0037475 A1 | | 2/2013 | Freter |

FOREIGN PATENT DOCUMENTS

| | | |
|---|---|---|
| EP | 1854526 A1 | 11/2007 |
| EP | 2123346 A1 | 11/2009 |
| WO | 2004080510 A2 | 9/2004 |
| WO | 2008018837 A2 | 2/2008 |

* cited by examiner

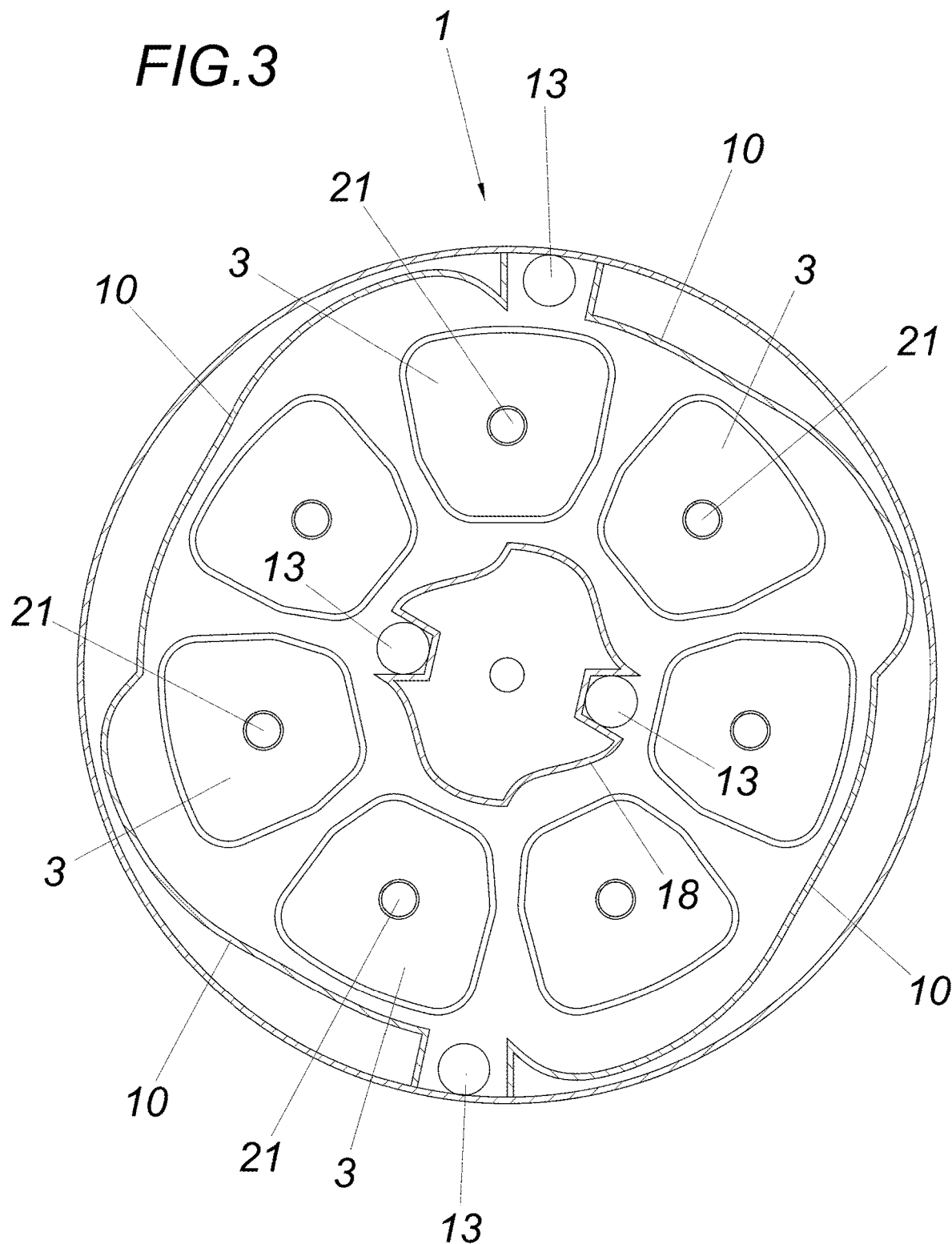

DEVICE FOR FILTERING LIQUIDS

CROSS-REFERENCE TO RELATED APPLICATIONS

The present application is a 371 of International application PCT/AT2020/060423, filed Nov. 27, 2020, which claims priority of AT A51048/2019, filed Dec. 2, 2019, the priority of these applications is hereby claimed, and these applications are incorporated herein by reference.

FIELD OF THE INVENTION

The present invention relates to a device for filtering liquids comprising a tank, a tank inlet for introducing a liquid to be filtered into the tank, a tank outlet for a retentate, and at least one rotor rotatably drivable around a tank axis, the at least one rotor having a hollow shaft supported in an end wall and attached thereto a support device for filter elements arranged at a distance from the tank axis, the filter elements being fluidically connected to the hollow shaft for discharging a filtered permeate from the tank, wherein an inner lateral surface of the tank comprises at least one guide for diverting the liquid toward the filter elements.

A device of this kind is known, for example, from US 2013/0015120 A1. The device disclosed therein comprises a tank having tank inlets for introducing a liquid to be filtered. The liquid is filtered through semipermeable filter elements such as membranes and discharged as permeate through a hollow shaft fluidically connected to the filter elements. To decrease the formation of a coating on the filter elements, these filter elements are supported on a rotor by means of a support device. By the rotation of the filter elements, shear forces are exerted on the filter elements during the filtration process, which leads to a mechanical cleaning of the filter surface. To effectively increase the turbulence in the area of the filter elements and to reduce the turbulence outside the area of the filter elements respectively, the inner surface of the tank comprises guides enabling the filter output to be considerably increased. The unfiltered retentate is discharged through a tank outlet. In general, the device should be usable for filtering different types of liquids. In particular in the case of biogenic suspensions and liquids comprising organic components such as proteins and carbohydrates, however, the process results are often difficult to reproduce.

In the treatment of water or wastewater, it is already known from U.S. Pat. No. 8,551,305 that electrodes can be used to adapt process conditions. Several oppositely poled electrodes are vertically arranged within a tank and generate a voltage field acting on the water or wastewater. The voltage field can be used, for example, for the separation of ions, for flocculation, for disintegration and for oxidation of substances present in the water or wastewater.

In general, the membrane-based filter technology for liquids to be filtered having a complex rheological and chemical behavior encounters the problem that process conditions and operating scenarios are extremely difficult to predict and to calculate. Thus, for designing such devices, empirical values provided by the operator or empirical values from devices which perform a similar process are very important.

SUMMARY OF THE INVENTION

It is an object of the present invention to improve a device of the type described above in such a way that, without the need to modify the basic construction of the device, it can also achieve reproducible filtration results for different liquids to be treated and in cases in which the operating scenarios are difficult to predict.

According to an aspect of the present invention at least one of the at least one guide forms a receptacle for at least one conditioning device for adjusting process conditions. As a result of this measure, the effectiveness of the at least one conditioning device is increased by the flow profile generated by the guide. The at least one guide located on the inner surface of the tank preferably forms a recess incorporated into the inner surface of the tank and has substantially three sections, which impress different flow characteristics on the liquid. A slightly curved calming section, which impresses a laminar flow profile on the liquid, is followed by an accelerating section having a greater curvature than that of the calming section, which increases the flow velocity of the liquid, however, without causing turbulence. Following this accelerating section is a pulsing section of even greater curvature, which diverts the liquid toward the tank axis, wherein turbulence is created by the acceleration and collision with the filter elements arranged at a distance from the tank axis. Depending on the type of the at least one conditioning device, the different sections of the at least one guide can be used to optimize the conditioning process. If a laminar flow profile is advantageous for a first conditioning device, it can be provided in the calming section. If, however, an immediate distribution over the entire area of the tank is desired, then, for example, it can be advisable to provide the conditioning device in the area of the pulsing section. The at least one guide thus not only offers the possibility of receiving different conditioning device but also makes it possible for the at least one conditioning device and thus for all of the process conditions such as viscosity, temperature, flow velocity, TOC value, pO2 content, pressure difference, etc., to be adjusted to their optimal values.

In principle, it is possible to provide the device with a single guide which forms a receptacle for one or more conditioning devices, or with several guides, each of which forming a receptacle for one or more conditioning devices.

Depending on the embodiment, the device for filtering liquids can comprise a single rotor or several rotors. For each rotor, a support device, e.g. a ring-shaped support device, for filter elements arranged at a distance from the tank axis is provided, which support device connects the filter elements fluidically to a hollow shaft and thereby enabling the permeate to be discharged. The discharge can occur through a common hollow shaft. A separate hollow shaft can however be associated with each support device. A first support device can be configured in such a way that the filter elements arranged on it describe an outer circular path, and a second support device can be configured so that the filter elements arranged on it describe an inner circular path having a diameter smaller than that of the outer circular path. Between the support devices of the rotors, for example, there may be arranged a support device for filter elements assigned to a stator, these filter elements being nonrotating. The permeate filtered by these nonrotating filter elements can also be discharged through a hollow shaft or through another discharge line passing through the tank.

So that the filter elements can rotate undisturbed with maximum exploitation of the interior space of the tank, it is proposed that a cavity be formed between the at least one guide and an outer lateral surface of the tank, wherein the cavity defines the receptacle for the at least one conditioning device for adjusting the process conditions. The at least one conditioning device is therefore not arranged directly within the interior space of the tank, which means that the flow profile is influenced primarily by the at least one guide. This facilitates any flow calculations preceding the layout of the device such as CFD simulations. Beyond that, a device can also be retrofitted with new conditioning devices without invalidating the preceding flow simulations. In addition, the advantage of the at least one conditioning device being easily accessible for any required maintenance work can be obtained and sensitive parts of the at least one conditioning device, for example, do not come in direct contact with the liquid in the tank.

So that electrokinetic phenomena can be generated in the liquid to be filtered, it is recommended that the at least one conditioning device is formed by at least two electrodes which are of opposite polarity so as to generate a voltage field to introduce a voltage field in the tank.

Another possibility for generating such electrokinetic phenomena is that the at least one conditioning device is a single electrode, wherein, to introduce a voltage field into the tank, at least one counterelectrode is assigned to at least one filter element. The counterelectrode has a potential different from that of the electrode, which can be ensured by, for example, grounding the stainless-steel inner core of the filter element acting as the counterelectrode.

It has been found that combining an electrode with the at least one guide increases the boundary-surface effects, such as electrocapillarity, which improves the ability of the permeate to pass through the membrane. The geometry of the at least one guide can be exploited in a particularly positive manner by configuring the at least one guide defining a receptacle for an electrode as part of the electrode. Thereby, it is achieved that, in an inhomogeneous liquid, the boundary surfaces between solid/liquid, liquid/liquid, and liquid/gaseous constituents are activated largely by way of the voltage field proceeding from the at least one guide, as a result of which the calming section, the accelerating section, and the pulsing section can be used to increase the formation of the boundary surfaces. The effect of the desired electrokinetic phenomena can thus be significantly increased, because the time during which the liquid is exposed to the voltage field is increased by the calming section, and a most intensive flow possible is achieved by the pulsing section, as a result of which, in combination with the increased boundary surface area, an intensification of the electrokinetic phenomena is obtained. The induced electrokinetic phenomena, however, not only positively affect the membrane output but can also cause changes in the constituents of the liquid to be filtered on a molecular level. For example, the polarity, the degree of agglomeration, and chemical reactions may be affected. Of course, known methods such as electrolysis can also be conducted in this way. The combination of membrane filter elements and electrokinetics is particularly useful in colloidally dispersed liquids (e.g., milk products), which have enormously large boundary surfaces relative to their volume as a result of the fine distribution of the various phases. The interaction of the membranes with these boundary surfaces between the phases mechanically activates the boundary surfaces. Essential to the electrostatic interaction between the phases (particles, droplets, tiny bubbles) is their charge and the Van-der-Waals forces acting between the molecules, respectively. These interactions can in turn be influenced by the electrokinetics, so that this combination of membrane and electrokinetic processes intensifies the activation at the phase boundaries via simultaneous mechanical and electrostatic pulses.

To generate a uniform voltage field, one guide receiving an electrode may be provided on each of two opposite sides of the inner lateral surface of the tank. The electrodes are of opposite polarity for generating a voltage field. There may also be provided several, e.g. three or six, guides arranged around a circumference of the inner lateral surface of the tank, each of which comprises an electrode forming a first electrode set. A second electrode set having a polarity opposite to that of the first electrode set may be provided in the area of the tank axis. As a result, the voltage field extends from the electrodes in the guide on the inner lateral surface of the tank across the filter elements to the electrode in the area of the tank axis. In an embodiment of the device comprising a plurality of rotors, the electrodes may also be arranged on a support device of a stator, wherein the support device for filter elements assigned to the stator is arranged between the support devices of the rotors. In order to maintain a stable voltage field for the various possible electrode arrangements, the filter elements are preferably grounded via stainless-steel internal cores. Independently of the actual arrangement of the electrodes, it has been found that, due to the large filter area and the high relative velocities between the liquid and the filter elements, the rotation of the filter elements in this voltage field results in a further increase in the boundary surfaces and thus in the desired electrokinetic phenomena.

To achieve a homogeneous temperature distribution throughout the entire tank or to reach or to maintain a temperature level favorable for the process, without contaminating the liquid being directed through the tank, the at least one conditioning device may be a heat exchanger for a tempering fluid for tempering the liquid to be filtered in the tank. Accordingly, no additional space is required for the heat exchanger in the interior of the tank filled with the liquid. Because of the large heat-exchange surface of the at least one guide, a high level of heat transfer can in turn be achieved. In the simplest case, the tempering fluid can be directed through the cavity of the at least one guide itself. To this end, the at least one guide may comprise a tempering fluid inlet and a tempering fluid outlet.

To be able to introduce different process liquids into the tank in a sterile manner and to simultaneously affect the flow profile in an intended manner, it is proposed that the at least one conditioning device is a dosing unit for process fluids injectable into the tank. The term "process fluids" should be understood to mean both liquids and gases. Examples of process fluids which may be used include emulsifiers, cleaning agents for cleaning the filter materials, disinfectants, oxygen, and substances for accelerating chemical and/or phase-separating processes. It is also conceivable that tempering fluids could be used as process fluids. In analogy to the conditioning devices already mentioned, the dosing unit may also make use of the geometry of the at least one guide to increase the effects of the process fluids. The dosing units may be used for manipulation of the process conditions during the filtration process; or they may also be used, before or after filtration, to sterilize or to clean the tank and the filter elements.

If the liquid to be filtered is to be conditioned even without the introduction of process fluids into the tank, the at least one conditioning device may be a lighting device for introducing electromagnetic waves. UV radiation, for example, can be used to disinfect the liquid.

So that the process and flow conditions can be influenced homogeneously throughout the entire tank, it is proposed that a rotor or a stator comprising at least one central guide for the fluid be arranged in the area of the tank axis, which rotor or stator forms a cavity defining the receptacle for the at least one conditioning device for adjusting the process conditions. As a result, all of the adjustments of the process conditions emanating from the at least one conditioning device can also be conducted from the center of the tank. The central guide can also itself serve as an electrode or as an electrode component.

BRIEF DESCRIPTION OF THE DRAWINGS

FIG. 3 shows a schematic cross section of an alternative embodiment of the device in a top view.

DETAILED DESCRIPTION OF SPECIFIC EMBODIMENTS

Figure 1:
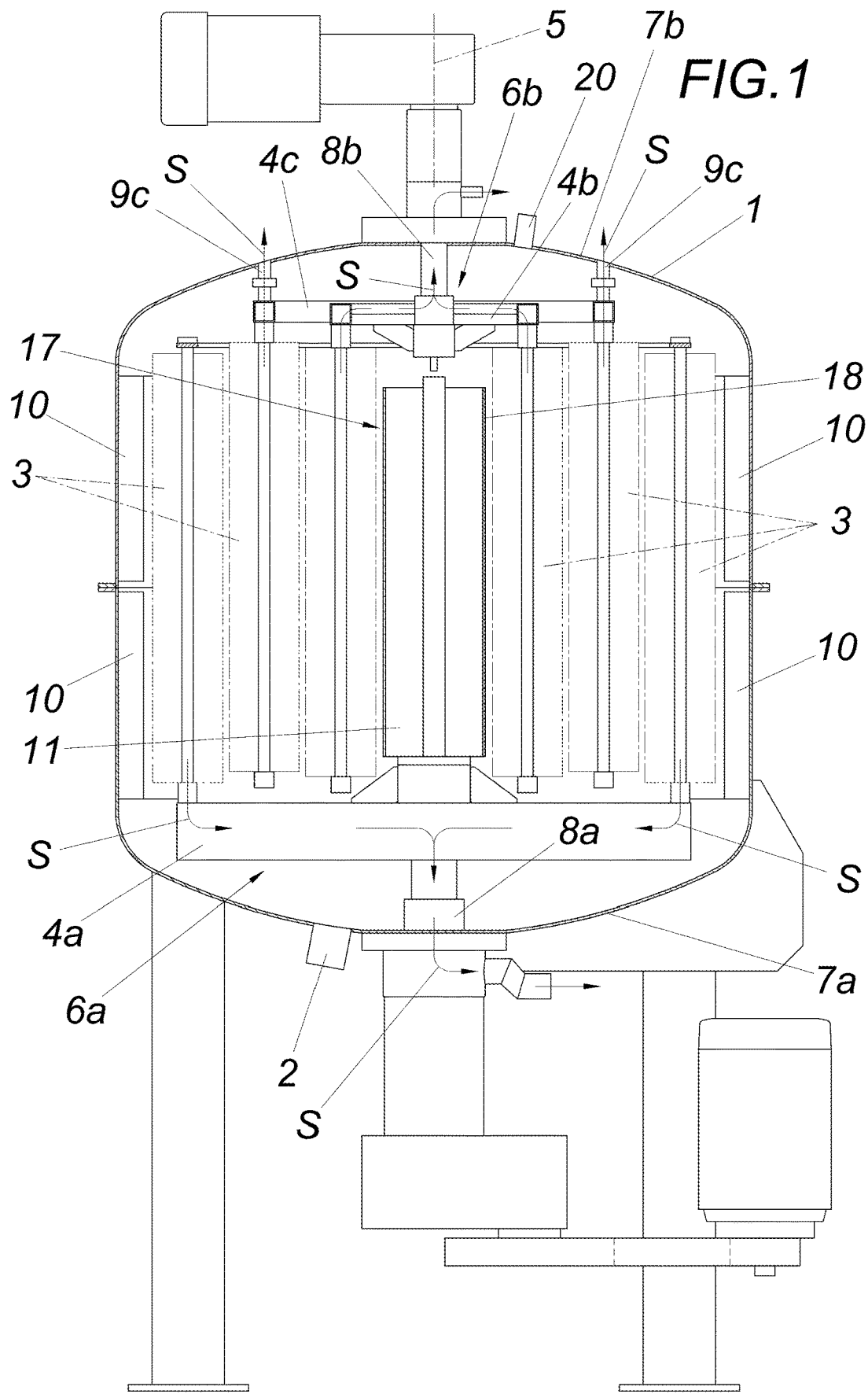
FIG. 1 shows a schematic cross section of a device for filtering liquids in a front view.
Figure 2:
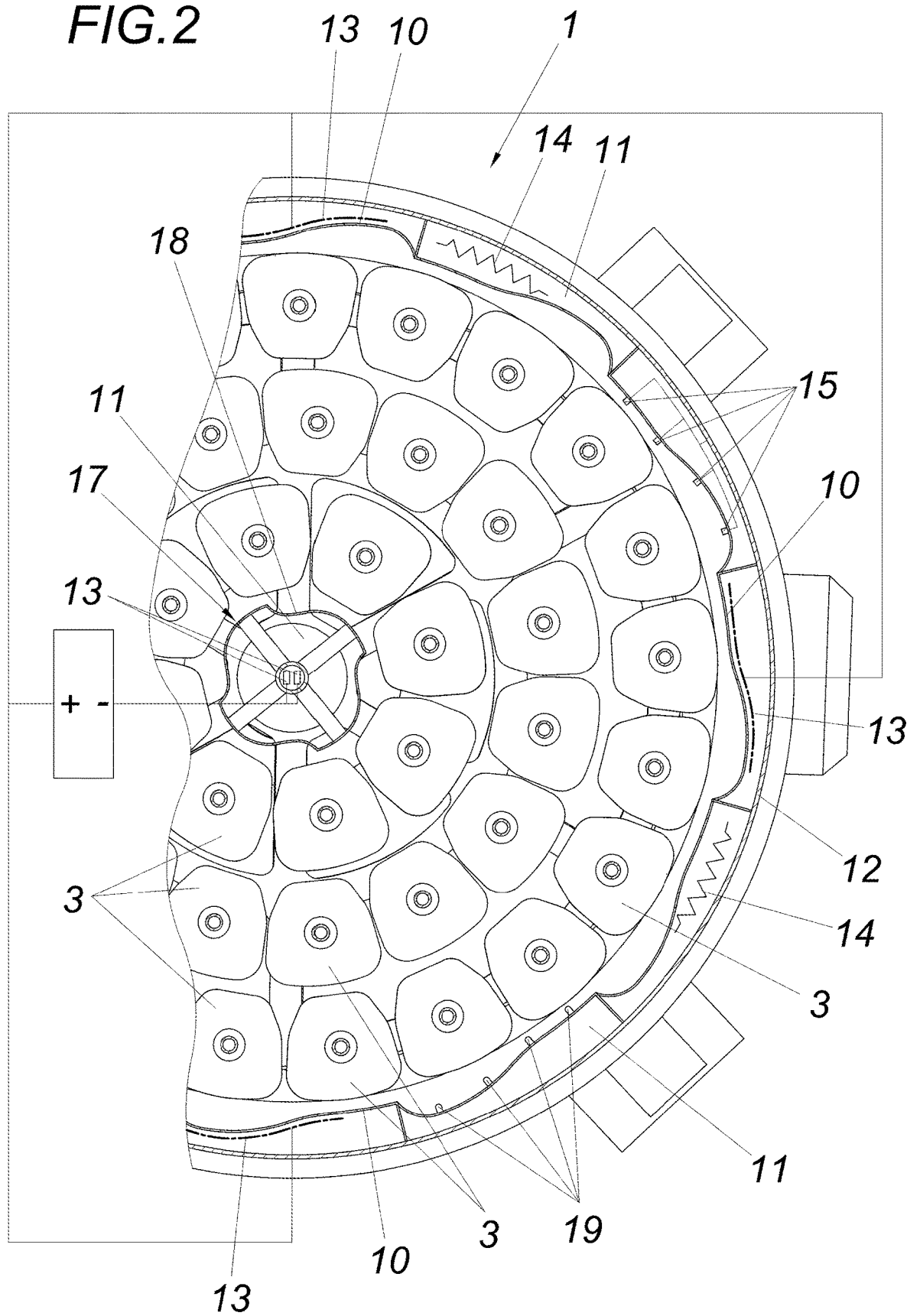
FIG. 2 shows a schematic cross section of the device in a top view.

As can be seen particularly in FIG. 1, a device according to an aspect of the present invention for filtering liquids, such as water, wastewater, inhomogeneous liquid mixtures, and raw materials and (intermediate) products used or generated in the food or chemical industry, comprises a tank 1, which can be filled through one or more connectors 2 functioning as tank inlets and/or as tank outlets. The liquid to be filtered is filtered or concentrated by means of filter elements 3, which are arranged on a support device 4a, b, c. The embodiment shown in FIG. 1 comprises three sets of filter elements 3. A first set of filter elements 3 is arranged on a support device 4a, which moves the filter elements 3 around an outer circular path. A second set of filter elements 3 is arranged on a support device 4b, which moves the filter elements 3 around an inner circular path. A third set of nonrotating filter elements 3 is located between the filters elements 3 arranged on the support device 4a and the filter elements 3 arranged on the support device 4b and is itself arranged on a support device 4c. Each of the support devices 4a, b is drivably connected to a rotor 6a, b rotatably drivable around a tank axis 5, each of these rotors comprising a hollow shaft 8a, b supported in an end wall 7a, b, the support devices creating a certain distance between the filter elements 3 and the tank axis 5. The static support device 4c creates a certain distance between the static filter elements 3 and the tank axis 5. The filter elements 3 are fluidically connected by the support devices 4a, b, c to the hollow shaft 8a, b and to the tank outlets 9c, thereby enabling the filtered permeate to be discharged from the tank 1 in the direction indicated by the flow arrows S. The concentrated retentate can be discharged through one or more connectors 2 functioning as tank outlets. To break the flow and to impress a desired flow profile on the liquid to be filtered, an inner lateral surface of the tank 1 comprises guides 10, which also direct the liquid to be filtered toward the filter elements 3. In principle, only a single guide 10 may be provided, although particularly favorable conditions for impressing a desired flow profile are obtained by arranging a plurality of guides 10 circumferentially around the inner lateral surface of the tank 1, as can be seen in FIG. 2, for example. According to an aspect of the present invention, the guides 10 form a receptacle for various conditioning devices for adjusting the process conditions, as a result of which a device can be upgraded even after it has been put into service. This means that, even at a later time, it is possible to respond to any process-related problems and to achieve maximum filter output without negatively affecting the flow behavior of the liquid to be filtered by installations within the tank 1.

So that the calculated flow profile to be impressed on the liquid by the guides 10 can form without hindrance even in the case of a plurality of conditioning devices, the receptacle can be a cavity 11 extending between a guide 10 and an outer lateral surface 12 of the tank 1, as can be seen in FIG. 2.

FIG. 2 shows potential conditioning devices arranged in the cavity 11, which defines the receptacle. To introduce electrokinetic phenomena, such as electrowetting, i.e., a change in the surface tension of the liquid to be filtered, electrodes 13 may be provided in the cavities 11. Particularly strong boundary surface-dependent phenomena are obtained when the guide 10 defining the receptacle for the electrode 13 is itself part of the electrode 13. It is obvious here that all of the electrodes used should be isolated vis-à-vis the tank 1.

To temper the liquid being directed through the tank without contaminating it, a heat exchanger 14 may be provided as a conditioning device.

Through dosing units 15 process fluids, such as emulsifiers, cleaning agents for cleaning the filtering materials, disinfectants, oxygen, and substances for accelerating chemical and/or phase-separating processes may further be injected. The dosing units 15 may comprise storage tanks.

FIG. 2 also shows a device comprising a plurality of guides 10. This is to be taken only as an example. A device may comprise any desired number of guides. In addition, a device may, for example, comprise only electrodes 13, only heat exchangers 14, or only dosing units 15 as conditioning devices, as well as any desired combination of these.

As can be derived particularly from FIG. 2, a rotor or a stator 17 may be arranged in the area of the tank axis 5, wherein this rotor or stator forms a cavity 11 defining the receptacle for two electrodes 13, and comprises a central guide 18. The electrodes 13 arranged in the stator 17 have a charge opposite to that of the electrodes 13 arranged in the guides 10 arranged on the inner lateral surface of the tank 1. The receptacle of the stator 17 may also comprise a heat exchanger 14 or a dosing unit 15. In an alternative embodiment, the central guide 18 itself can be configured as an electrode.

Lighting devices 19 may also be provided as conditioning device both in the guides 10 and in the central guide 18.

To generate advantageous conditions for filling and emptying the device, the device may comprise a vent valve 20. This valve 20 may also be used for the continuous emptying of the retentate.

FIG. 3 shows an alternative embodiment of the device according to an aspect of the present invention. The receptacles formed by the guides 10 receive a first set of electrodes 13. The central guide 18 receives a second set of electrodes 13. The counterelectrodes are formed by the stainless-steel internal cores 21 of the filter elements 3. The voltage field thus acts between the first set of electrodes 13 and the stainless-steel internal cores 21 and between the second set of electrodes 13 and the stainless-steel internal cores 21.

The invention claimed is:

1. A device for filtering liquids comprising:
a tank, a tank inlet for introducing a liquid to be filtered into the tank, a tank outlet for a retentate, and at least one rotor rotatably drivable around a tank axis, the at least one rotor having a hollow shaft supported in an end wall of the tank and attached thereto a support device for filter elements arranged at a distance from the tank axis, the filter elements being fluidically connected to the hollow shaft for discharging a filtered permeate from the tank, wherein an inner lateral surface of the tank comprises at least one guide for diverting the liquid toward the filter elements, wherein the at least one guide forms a receptacle for at least one conditioning device for adjusting process conditions, wherein the at least one conditioning device includes an electrode, and wherein a counterelectrode is assigned to at least one filter element of the filter elements, the electrode and the counterelectrode introducing a voltage field into the tank.

2. The device according to claim 1, wherein a cavity is formed between the at least one guide and an outer lateral surface of the tank, wherein the cavity defines the receptacle for the at least one conditioning device for adjusting the process conditions.

3. The device according to claim 1, wherein the electrode and the counterelectrode are of opposite polarity so as to generate the voltage field.

4. The device according to claim 1, wherein the at least one guide defining the receptacle for the electrode is part of the electrode.

5. The device according to claim 1, wherein the at least one conditioning device further includes a heat exchanger for a tempering fluid for tempering the liquid to be filtered in the tank.

6. The device according to claim 1, wherein the at least one conditioning device further includes a dosing unit for process fluids injectable into the tank.

7. The device according to claim 1, wherein the at least one conditioning device further includes a lighting device for introducing electromagnetic waves.

8. The device according to claim 1, further comprising a central rotor or a central stator comprising at least one central guide for the liquid is arranged in an area of the tank axis, wherein the central rotor or the central stator forms a cavity defining the receptacle for the at least one conditioning device for adjusting the process conditions.

* * * * *